United States Patent [19]
Cook et al.

[11] Patent Number: 5,188,141
[45] Date of Patent: Feb. 23, 1993

[54] VACUUM BOOST VALVE

[75] Inventors: John E. Cook; Murray F. Busato; William C. Gillier, all of Chatham, Canada

[73] Assignee: Siemens Automotive Limited, Chatham, Canada

[21] Appl. No.: 801,986

[22] Filed: Dec. 3, 1991

[51] Int. Cl.$^5$ .................. F16K 11/10; F16K 31/365
[52] U.S. Cl. .................. 137/112; 123/520; 137/505.36; 137/907
[58] Field of Search ........ 137/112, 114, 907, 505.22, 137/505.36; 123/407, 520, 568

[56] References Cited

U.S. PATENT DOCUMENTS

| | | | |
|---|---|---|---|
| 1,795,319 | 3/1931 | Spohr | 137/907 X |
| 3,164,170 | 1/1965 | Gütter | 137/567 |
| 3,913,545 | 10/1975 | Haase et al. | 123/520 |
| 4,026,258 | 5/1977 | Ino et al. | 123/520 |
| 4,235,207 | 11/1980 | Nishimura | 123/568 |
| 4,951,637 | 8/1990 | Cook | 123/520 |
| 5,005,550 | 4/1991 | Bugin et al. | 123/520 |
| 5,083,546 | 1/1992 | Detweiler et al. | 137/907 |

Primary Examiner—Stephen M. Hepperle
Attorney, Agent, or Firm—George L. Boller; Russel C. Wells

[57] ABSTRACT

A vacuum boost valve senses when the intensity of vacuum from a variable intensity vacuum source is about to drop below a threshold and supplies a boost so that when the intensity of the vacuum source is within a range immediately below the threshold, the intensity of vacuum delivered to a load does not drop below the intensity of the vacuum source and is in fact increased over what it would otherwise be without the boost. The vacuum boost is obtained by using a venturi.

10 Claims, 4 Drawing Sheets

VACUUM BOOST VALVE

FIELD OF THE INVENTION

This invention relates to a valve which is responsive to an incipient drop in the intensity of a variable intensity vacuum input below a certain threshold and which during the ensuing time that the intensity of the vacuum input remains within a certain range immediately below the threshold delivers a vacuum output that is at least as great as the threshold.

BACKGROUND AND SUMMARY OF THE INVENTION

Certain emission control systems of modern internal combustion engine powered automotive vehicles use devices that rely upon vacuum power for their operation. Two examples of such devices are an exhaust gas recirculation (EGR) valve and a canister purge solenoid (CPS) valve. The usual source of vacuum for these devices is the intake manifold vacuum that is created in the engine's intake manifold when the engine is running.

At certain times during operation of an automotive vehicle, the magnitude, or intensity, of manifold vacuum may drop to rather low levels. Certain vacuum operated devices such as those mentioned above may require that the vacuum power to them be above a certain threshold level for them to operate in accordance with relevant specifications. The very low levels to which intake manifold vacuum may at times drop during operation of an automotive vehicle may be less than such threshold level. While such very low vacuum levels are typically only transitory in nature, they may contribute to transitory increases in emissions due to the inability of the emission control devices to receive at least the threshold level of vacuum. Because emission levels are strictly controlled by government laws and regulations, such transitory increases in emissions may result in non-compliance with relevant standards in some cases.

The present invention is directed to a vacuum boost valve that, when the intensity of vacuum from the vacuum source drops within a certain range immediately below the threshold level, is effective to maintain the vacuum input to such devices above the threshold level and thereby avoid situations such as those described above. A valve embodying principles of the invention may be used with various utilization devices other than the emission control devices that have been mentioned.

The invention will be described in detail with reference to accompanying drawings that illustrate a presently preferred embodiment of the invention according to the best mode contemplated at this time for carrying out the invention. Like reference numerals are used to designate like parts in the drawings.

DESCRIPTION OF THE PREFERRED EMBODIMENT

Figure 1:
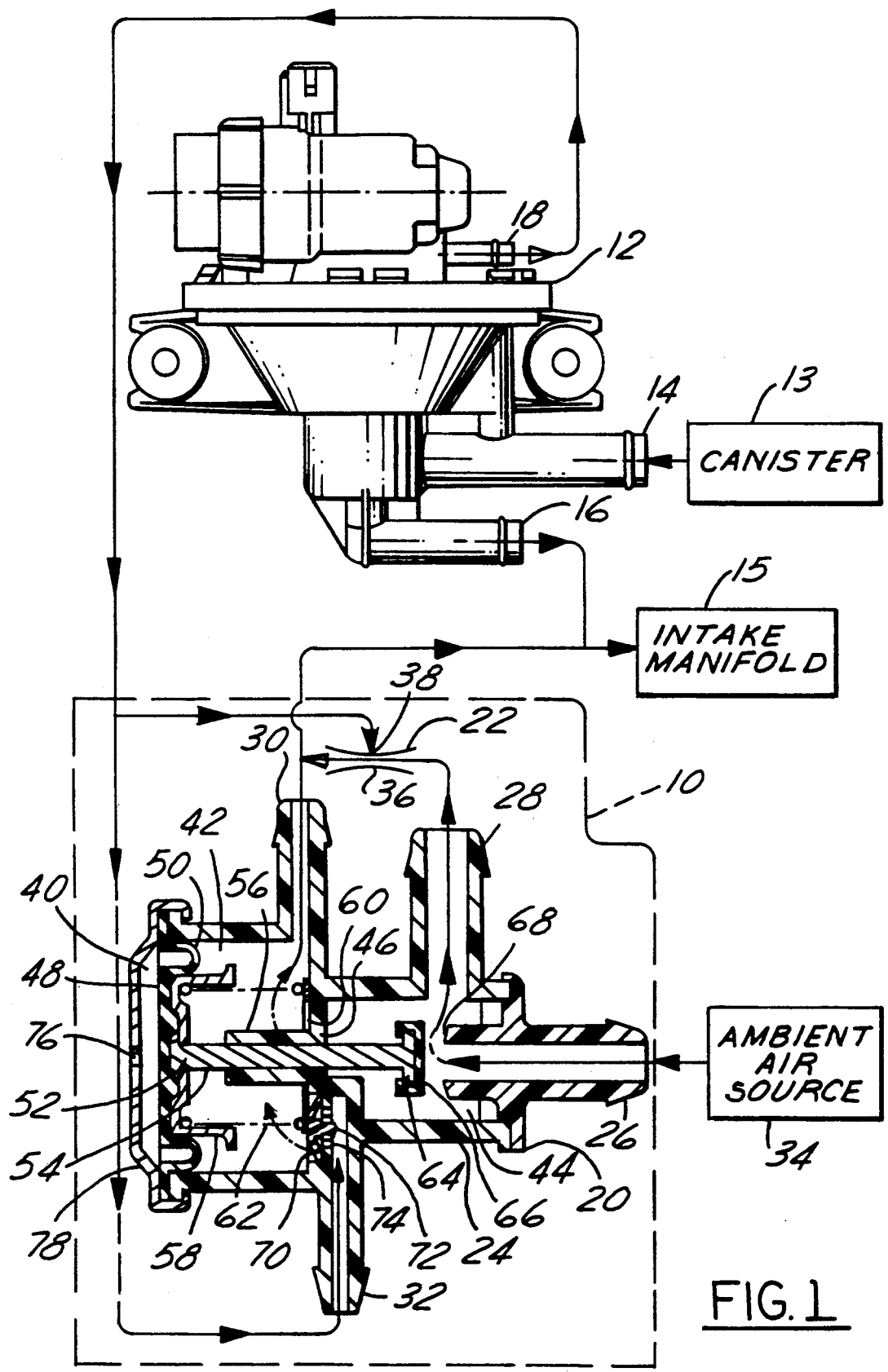
FIG. 1 is a view, partly in cross section, and partly schematic, of a first embodiment of vacuum boost valve according to the present invention in association with a utilization device in the form of a CPS valve.

FIG. 1 illustrates a vacuum boost valve (VBV) 10 embodying principles of the invention operatively associated with a CPS valve 12. CPS valve 12 represents a device that is utilized in evaporative control systems to control the purging of a fuel vapor collection canister 13 to engine intake manifold 15. CPS valve 12 comprises a canister port 14 connected to canister 13 and a vacuum port 16 connected to intake manifold 15. It also comprises a vacuum operating port 18 at which vacuum for operating the valve is received.

VBV 10 comprises a low vacuum/control valve 20 in association with a venturi 22. Low vacuum/control valve 20 is illustrated in cross section while venturi 22 is schematically portrayed.

Low vacuum/control valve 20 comprises body structure 24 which has four ports 26,28,30,32 in the form of nipples for receiving the ends of conduits to operatively associate VBV 10 with CPS valve 12 in the operative system.

Port 26 is connected by a suitable conduit to a filtered source of ambient air 34. Port 28 is connected to an upstream entrance end of venturi 22, and port 30 is connected by means of a tee to a downstream exit end of venturi 22 and to intake manifold 15. Port 32 is connected to control port 18 of CPS valve 12. Venturi 22 has a low pressure zone 36 and comprises a tap 38 that is teed into the conduit between port 32 and control port 18 so as to be placed in communication with both ports.

Body structure 24 has a generally circular cylindrical shape and is constructed to endow valve 20 with three chamber spaces 40, 42, and 44. Chamber space 42 is divided from chamber space 44 by a fixed internal wall 46 while chamber space 40 is divided from chamber space 42 by means of a movable internal wall 48. Wall 48 comprises a rolling diaphragm 50 having one face toward chamber space 40 and the other toward chamber space 42. To a central region of the face of diaphragm 50 which is toward chamber space 42 is affixed the combination of a spring seat 58 and one end of a circular cylindrical shank 52 of a valve member 54. Wall 46 contains a cylindrical sleeve 56 that provides for the axial guidance of shank 52 in guiding the motion of valve member 54 in a manner to be subsequently more fully described. A second spring seat 60 is disposed against wall 46 within chamber space 42. A helical coil spring 62 is disposed in chamber space 42 seated on these two spring seats, and it serves to resiliently bias movable wall 48 to the position illustrated in FIG. 1.

Shank 52 passes from chamber space 42 through sleeve 56 into chamber space 44 where it is seen that valve member 54 also contains a circular head 64 including a seal 66. This valve head is arranged for selective seating on and unseating from a circular valve seat 68 that is disposed interiorly of chamber space 44 at the interior end of a conduit leading from port 26. In the position illustrated in FIG. 1 the valve head is unseated from the seat.

Ports 26 and 28 are in communication with chamber space 44, and so with valve head 64 unseated from valve seat 68 as shown in FIG. 1, a flow path exists from port 26 through chamber space 44 to port 28. When valve member 54 is axially displaced from the FIG. 1 position to seat head 64 on seat 68, that flow path is closed.

Port 30 is in direct communication with chamber space 42. Port 32 is in communication with chamber space 42 through a check valve 70. Check valve 70 comprises an elastomeric umbrella valve element 72 that is mounted on an internal wall portion of body structure 24 between port 32 and chamber space 42. The stem of the umbrella is mounted in a central hole in that wall and there are a series of surrounding holes 74 that provide for port 32 to communicate with chamber space 42 when the umbrella valve is opened. Thus, check valve 70 permits flow in the direction from outlet 32 to chamber space 42, but not in the opposite direction.

Chamber space 40 is communicated to ambient air via a hole 76 in a cap 78 that closes the end of body structure 24 opposite port 26.

VBV 10 operates in the following manner. So long as intake manifold vacuum, as referenced to ambient air pressure, has an intensity greater than a certain threshold, there is a sufficiently large pressure difference across movable wall 48 that the movable wall forces valve member 54 to close the flow path between ports 26 and 28. Intake manifold vacuum is conducted to control port 18 of CPS valve 12 through a primary flow path which comprises port 30, chamber space 42, check valve 70, and port 32. Because the flow path between ports 26 and 28 is closed, there is no flow through venturi 22, and consequently the venturi has no effect on the system. (While the directions of the arrows in the drawings indicate the direction of flow in various flow paths when flow occurs, they should not necessarily be construed to imply that flow in any particular flow path is occurring concurrently with flow in any other flow path.)

Whenever the manifold vacuum drops to a level that is within a range immediately below the threshold, VBV 10 operates as follows. This may be conveniently referred to as the vacuum boost mode of operation. The pressure differential across movable wall 48 is sufficiently small that spring 62 forces valve member 54 to open the flow path between ports 26 and 28. This allows flow from the filtered ambient air source 34 through port 26, chamber space 44, port 28, and venturi 22 to intake manifold 15. As the flow passes through venturi 22, vacuum is created in low pressure zone 36 in accordance with the venturi principle. This vacuum is communicated by tap 38 to control port 18. This vacuum has an intensity greater than that of the intake manifold vacuum, and consequently check valve 70 is caused to close because the venturi vacuum is also being transmitted to port 32 while chamber space 42 remains in communication with intake manifold vacuum. Consequently, the primary flow path (from intake manifold 15 through valve 20 to control port 18), that existed when the intake manifold vacuum was above the threshold, is now closed, and venturi 22 now provides vacuum to control port 18 of an intensity that is greater than the vacuum input to the VBV at port 30. Attainment of this sort of intensity for the venturi vacuum is accomplished by utilizing the conventional venturi design techniques, also taking into account the nature of the vacuum load imposed by CPS valve 12.

Thus, it has been shown that VBV 10 is effective to boost a sag in intake manifold vacuum that might otherwise adversely effect the operation of CPS valve 12. When intake manifold vacuum once again returns to an intensity greater than the threshold, valve member 54 is again forced closed, and the system operates in the manner described above for intake manifold vacuum exceeding the threshold level.

By way of example, CPS valve 12 may function properly at intake manifold vacuum levels at or above four inches of mercury, and in such case VBV 10 may be designed to switch to the vacuum boost mode of operation upon incipiency of the intake manifold vacuum falling below a threshold of five inches of mercury. This will assure that adequate operating vacuum is maintained for CPS 12 for manifold vacuum within a range immediately below the threshold.

Figure 2:
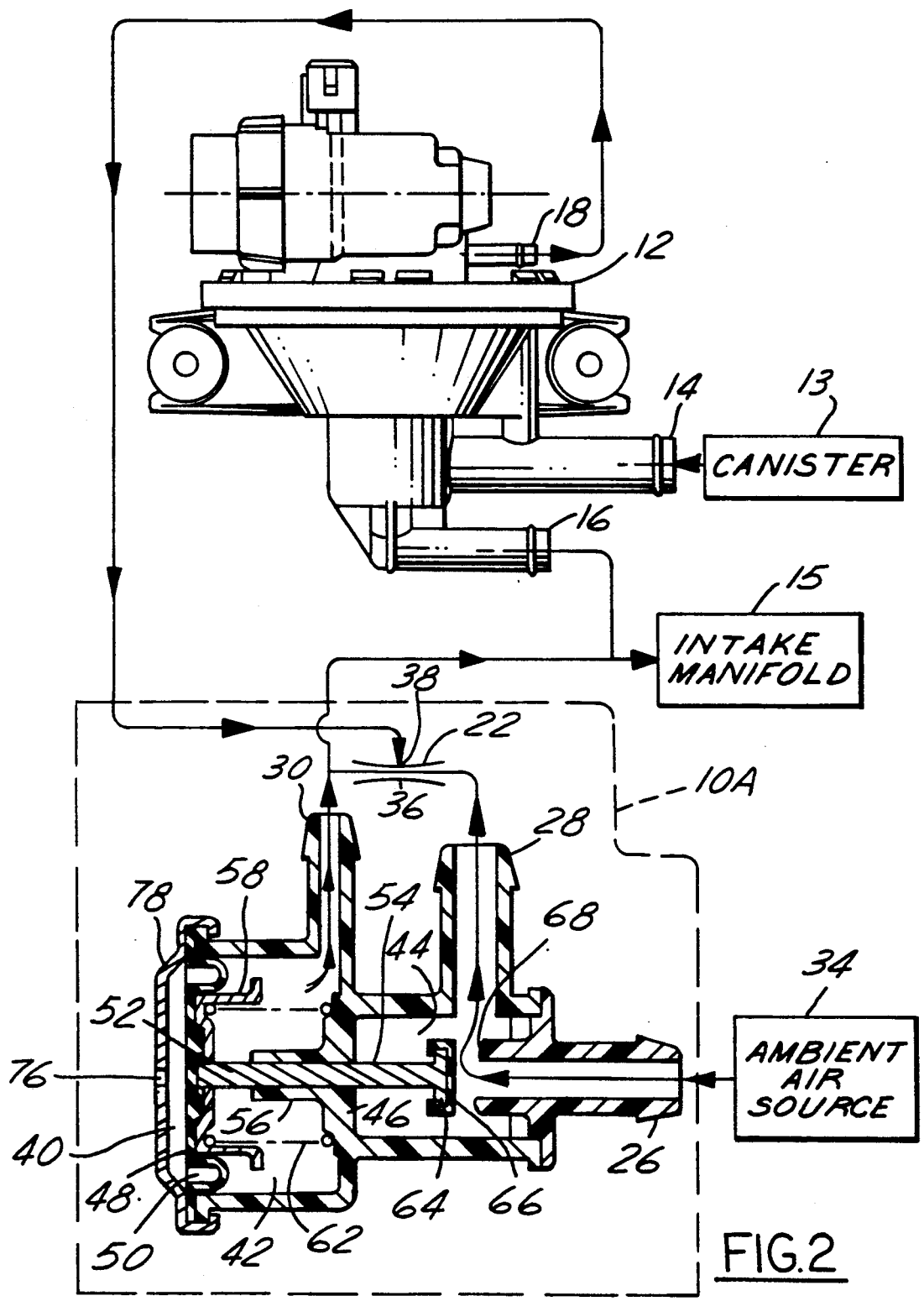
FIG. 2 is a view, partly in cross section, and partly schematic, of a second embodiment of vacuum boost valve according to the present invention in association with a utilization device in the form of a CPS valve.

A second embodiment 10A is shown in FIG. 2 and is exactly like VBV 10 of FIG. 1 except that check valve 70 and port 32 are omitted. Spring seat 60 is also omitted so that spring 62 bears directly against wall 46. In this embodiment, the primary flow path that exists when intake manifold vacuum exceeds the threshold is from intake manifold 15 through the exit end of venturi 22 and through tap 38. When the VBV operates in the vacuum boost mode, the flow path is the same as was described in FIG. 1.

Figures 3, 4:
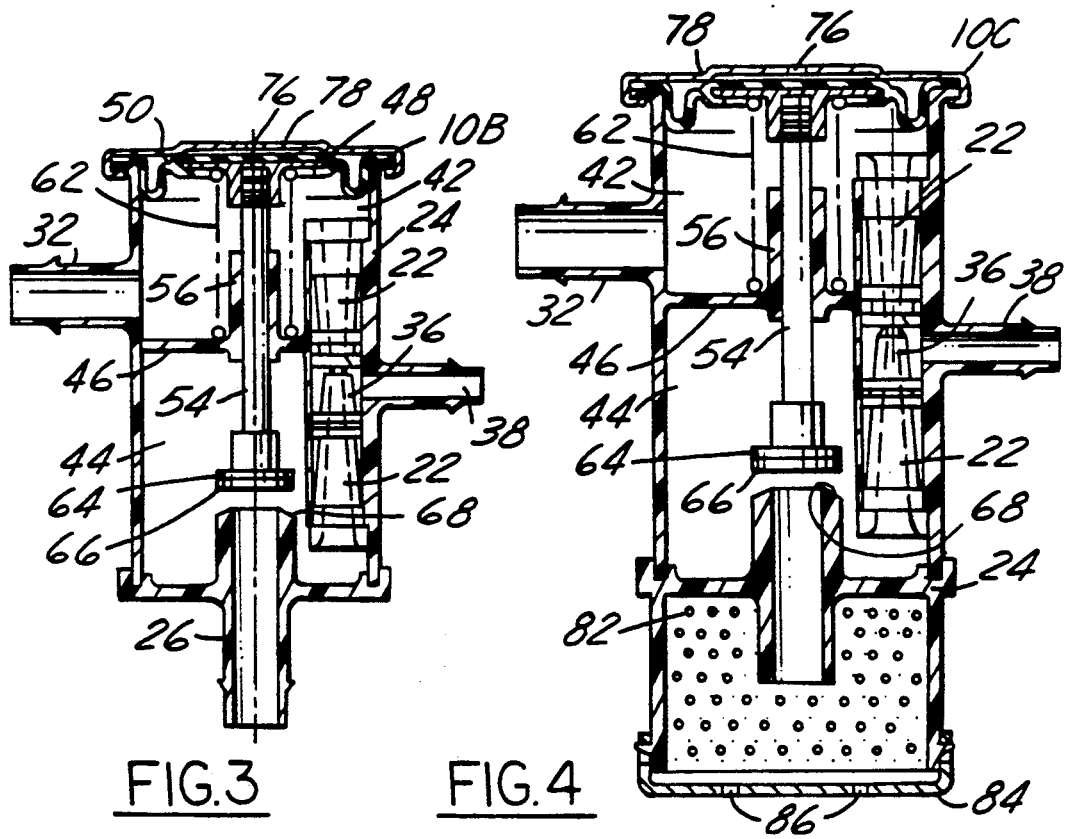
FIG. 3 is a cross sectional view of a third embodiment of a vacuum boost valve.
FIG. 4 is a cross sectional view of a fourth embodiment of a vacuum boost valve.

FIG. 3 illustrates a third embodiment of VBV 10B in which venturi 22 is disposed internally of body structure 24, unlike FIGS. 1 and 2 where the venturi is external to body structure 24.

FIG. 4 illustrates a fourth embodiment of VBV 10C by itself. In this embodiment, venturi 22 is disposed internally of body structure 24, and additionally an integral filter 82 encloses the portion of port 26 that is external to chamber space 44. Filter 82 is retained in place by means of a cap 84 that snaps over the free end edge of a cylindrical portion of body structure 24 that bounds the perimeter of the filter. The cap contains a number of suitably sized inlet holes 86 that allow air to enter the filter.

Figure 5:
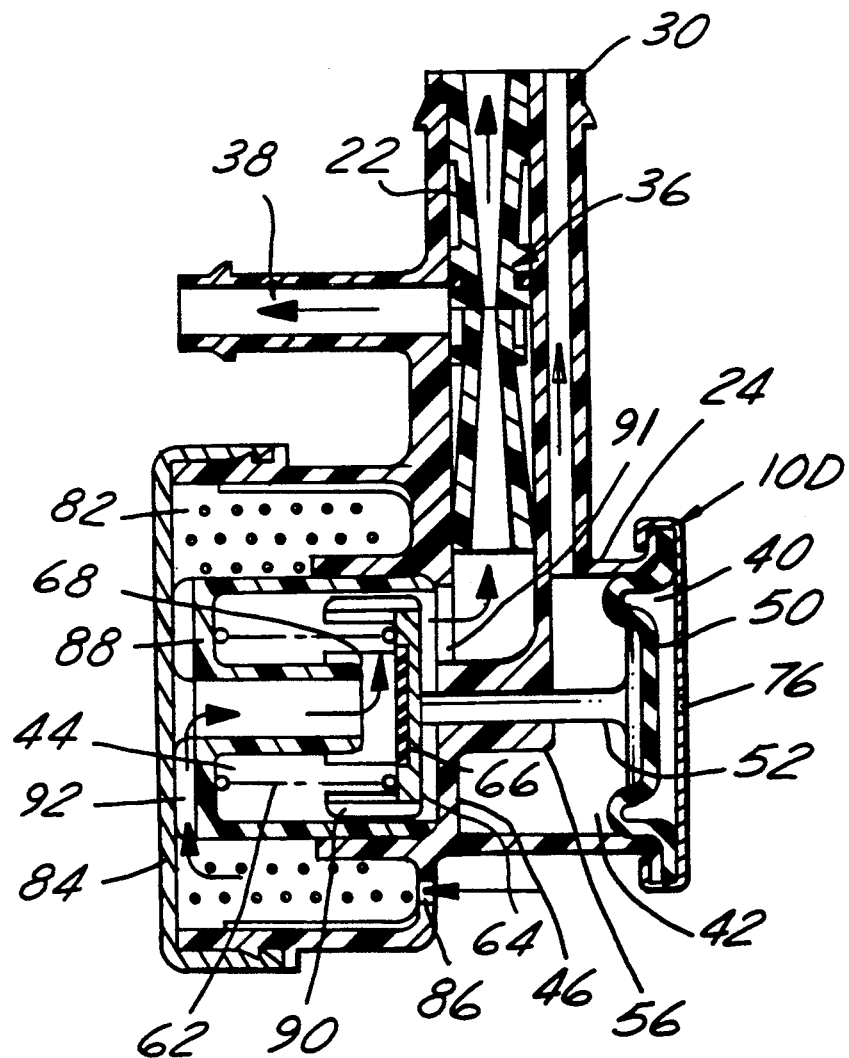
FIG. 5 is a cross sectional view of a fifth embodiment of a vacuum boost valve.

FIG. 5 illustrates a fifth embodiment of VBV 10D by itself. Like VBV's 10B and 10C, VBV 10D integrates venturi 22 into body structure 24, but in such a manner that the venturi fits within a portion of, and is parallel to, the nipple that forms port 30. That nipple serves to communicate both port 30 and the venturi exit to intake manifold vacuum. Valve member 54 is replaced by two separate pieces, one that is disposed against diaphragm 50 and contains shank 52, and another that contains valve head 64 and seal 66. Spring 62 is disposed in chamber space 44 between an end wall 88 and valve head 64 to resiliently urge the latter away from seat 68, and in the process of doing so maintain valve head 64 against the rounded free end of shank 52. The part that contains valve head 64 also has a skirt 90 that serves to guide the axial motion of the part toward and away from seat 68. The O.D. of the skirt contains a number of axially extending slots that provide for filtered air to pass from chamber space 44 through a hole 91 in wall 46 to the venturi entrance when valve head 64 is unseated from seat 68. Filter 82 has a circular annular shape and while it is retained on the body structure by cap 84, the cap end is imperforate, and airholes 86 are relocated from the cap end to a flange of the body structure at the end of the filter opposite the cap. When the valve head is unseated from the seat, air flows in the direction indicated by the arrows, passing from the airholes axially through the filter, and then making a 180 degree reversal by passing radially through slots 92 in the exterior of end wall 88 and then axially through the central tubular conduit leading to valve seat 68. VBV 10D operates in the same manner as the others; it represents however, a more compact configuration which may be beneficial from the standpoints of manufacturing cost and/or intended usage.

Figure 6:
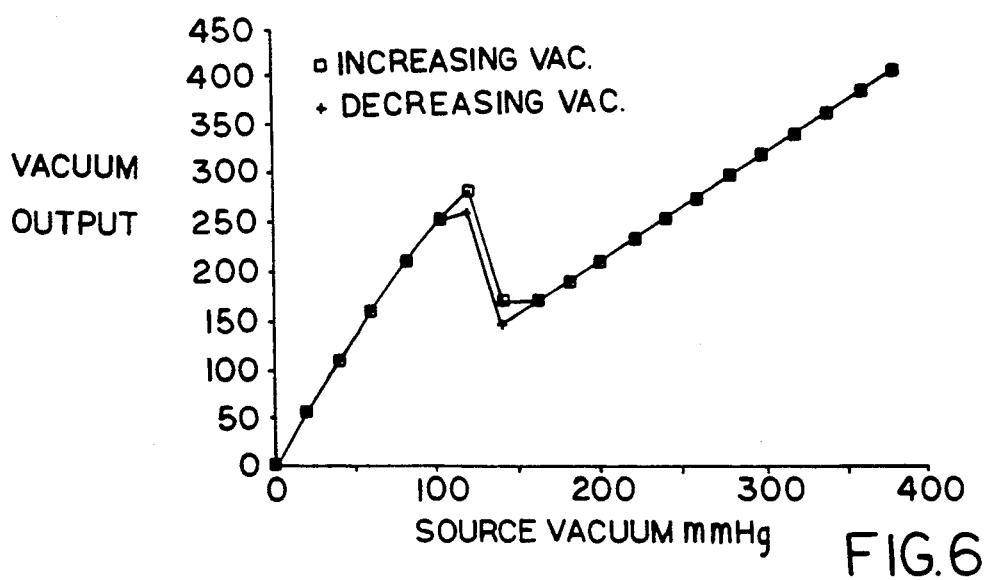
FIG. 6 is a graph plot illustrating a representative performance characteristic for a vacuum boost valve embodying principles of the invention.

FIG. 6 illustrates the effect of the vacuum boost valve. It can be seen that a representative vacuum boost mode exists over a range of vacuum inputs immediately below the approximately 140 mm of mercury threshold level. From consideration of the vacuum characteristic below the threshold, one can see that the vacuum boost is not merely at least as great as the vacuum input at port 30, but indeed is substantially greater over virtually the entire range below the threshold.

In the disclosed embodiments of VBV, it has been stated that the pressure in chamber space 40 is ambient, or atmospheric, pressure. It should be understood that any equivalent pressure that is correlated therewith could be used instead. While a presently preferred embodiment has been disclosed, it should be appreciated that principles of the invention may be embodied in other equivalent ways.

What is claimed is:

1. A vacuum boost valve that is responsive to an incipient drop in the intensity of a variable intensity vacuum input to the valve below a threshold level for providing, during the ensuing time that the intensity of the vacuum input remains within a certain range immediately below such threshold level, an intensity of vacuum output that is at least as great as the intensity of vacuum input, and is in fact greater than it otherwise would be without the vacuum boost thus provided, vacuum being measured relative to a reference pressure, said vacuum boost valve comprising:

an inlet port that receives the variable intensity vacuum input;
an outlet port that delivers the vacuum output;
a flow path that extends from a source of pressure higher than the pressure at said inlet port to said inlet port and that comprises a shut-off valve and a venturi in series;
said venturi comprising a low pressure zone at which vacuum is created by certain flow from said source of pressure through said flow path to said inlet port;
a tap at said venturi's low pressure zone that is communicated to said outlet port;
a movable wall and a spring that control said shut-off valve, said spring biasing said shut-off valve open, said movable wall comprising opposite faces that are communicated respectively to a pressure that is correlated with said reference pressure and to said inlet port respectively;
means operatively relating said movable wall, said spring and said shut-off valve such that said shut-off valve is maintained closed by said movable wall so long as the intensity of vacuum at said inlet port is greater than said threshold level, and such that said shut-off valve is maintained open by said spring so long as the intensity of vacuum at said inlet port is less than said threshold level;
and means operatively relating said source of pressure, said shut-off valve, and said venturi in said flow path such that when said shut-off valve is closed, there is no flow through said flow path and the pressure at said tap is essentially equal to the intensity of vacuum at said inlet port, and such that when said shut-off valve is open, there is flow through said flow path that is effective to create at said tap a vacuum whose intensity is at least as great as that of the vacuum input, and is in fact greater than it would otherwise be without the boost that is provided by the venturi.

2. A vacuum boost valve as set forth in claim 1 in which the pressure that is correlated with said reference pressure is in fact said reference pressure.

3. A vacuum boost valve as set forth in claim 2 in which said inlet port communicates with a chamber space that is bounded by one face of said movable wall, and further including a further flow path comprising a check valve between said chamber space and said outlet port, said check valve being arranged to allow flow from said chamber space to said outlet port and to disallow flow from said outlet port to said chamber space.

4. A vacuum boost valve as set forth in claim 2 in which a first chamber space is bounded by one face of said movable wall, and a second chamber space is bounded by another face of said movable wall, and a third chamber space is disposed adjacent said second chamber space and separated therefrom by a fixed wall, and said shut-off valve comprises an axially movable valve member having a shank that extends from a connection to said movable wall through a guide therefor in said fixed wall to a valve head that is disposed in said third chamber space and that is selectively operable to seat on and unseat from a valve seat in said third chamber space.

5. A vacuum boost valve as set forth in claim 4 in which said spring is disposed in said second chamber space.

6. A vacuum boost valve as set forth in claim in which said venturi is disposed externally of valve body structure which houses said movable wall, said shut-off valve, and said spring.

7. A vacuum boost valve as set forth in claim 1 in which said venturi is disposed internally of valve body structure which contains said ports and houses said movable wall, said shut-off valve, and said spring.

8. A vacuum boost valve as set forth in claim 7 in which said valve body structure comprises a first chamber space bounded by one face of said movable wall, a second chamber space bounded by another face of said movable wall, and a third chamber space disposed adjacent said second chamber space and separated therefrom by a fixed wall, and said shut-off valve comprises an axially movable valve member having a shank that extends from a connection to said movable wall through a guide therefor in said fixed wall to a valve head that is disposed in said third chamber space and that is selectively operable to seat on and unseat from a valve seat in said third chamber space, said valve member comprising two pieces, one containing said shank and the other containing said valve head, and in which said spring is disposed in said third chamber space to keep said valve head biased against said shank.

9. A vacuum boost valve as set forth in claim 8 in including an annular air filter disposed in surrounding relation to said third chamber space and in which said filter and flow path are arranged such that air entering said third chamber space is required to have passed axially through said air filter and then made a 180 degree reversal before entering said third chamber space, and in which the part that contains said valve head comprises a skirt that provides for guidance of the axial motion of said valve head within said third chamber space, and axial slot structure in the outside surface of said skirt for conveying air to an exit from said third chamber space.

10. A vacuum boost valve as set forth in claim 7 in which said venturi comprises an exit and said venturi is disposed in a portion of a nipple of said valve body structure via which nipple both the venturi exit and the inlet port are communicated to the variable intensity vacuum input.

* * * * *